(12) United States Patent
Ramachandran

(10) Patent No.: US 10,373,192 B2
(45) Date of Patent: Aug. 6, 2019

(54) MATCHING CONVERSIONS FROM APPLICATIONS TO SELECTED CONTENT ITEMS

(71) Applicant: Google LLC, Mountain View, CA (US)

(72) Inventor: Vinod Kumar Ramachandran, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 953 days.

(21) Appl. No.: 14/470,201

(22) Filed: Aug. 27, 2014

(65) Prior Publication Data

US 2016/0050167 A1 Feb. 18, 2016

Related U.S. Application Data

(60) Provisional application No. 62/038,671, filed on Aug. 18, 2014.

(51) Int. Cl.
*G06Q 30/02* (2012.01)
*H04L 12/58* (2006.01)
(Continued)

(52) U.S. Cl.
CPC ........ *G06Q 30/0242* (2013.01); *G06Q 30/02* (2013.01); *G06Q 30/0246* (2013.01);
(Continued)

(58) Field of Classification Search
CPC .......... G06Q 30/0246; G06Q 30/0242; G06Q 30/02; G06Q 30/0277; H04L 67/42
(Continued)

(56) References Cited

U.S. PATENT DOCUMENTS 6,332,126 B1 * 12/2001 Peirce .................. G06Q 30/02
705/14.25
7,124,092 B2 * 10/2006 O'Toole, Jr. ......... G06Q 20/02
705/14.26
(Continued)

OTHER PUBLICATIONS

The International Search Report and Written Opinion of the International Searching Authority issued in PCT/US2015/043400, dated Oct. 26, 2015.
(Continued)

*Primary Examiner* — Aaron N Strange
(74) *Attorney, Agent, or Firm* — Foley & Lardner LLP

(57) ABSTRACT

Matching conversions from within applications on a client device to interactions with content items presented with resources may include receiving first data associated with an interaction with a content item displayed with a resource. The first data includes an application identifier for an application associated with the content item and an account identifier. The matching may also include receiving second data from the client device associated with a conversion using the application. The second data includes the application identifier and a device identifier for the client device. The matching may further include receiving third data from the client device that includes the account identifier and the device identifier. The conversion can be determined as associated with the interaction with the content item displayed with the resource based on matching the second data with the first data based on the third data.

20 Claims, 7 Drawing Sheets

(51) Int. Cl.
*H04L 29/06* (2006.01)
*H04L 29/08* (2006.01)

(52) U.S. Cl.
CPC ....... *G06Q 30/0277* (2013.01); *H04L 51/046* (2013.01); *H04L 67/22* (2013.01); *H04L 67/42* (2013.01)

(58) Field of Classification Search
USPC .................................. 705/14.01, 14, 14.48
See application file for complete search history.

(56) References Cited

U.S. PATENT DOCUMENTS

| | | | | |
|---|---|---|---|---|
| 7,742,946 B2* | 6/2010 | Banks | .................. | G06Q 30/02 705/14.1 |
| 7,945,573 B1* | 5/2011 | Barnes | ................... | G06Q 30/02 707/705 |
| 8,396,822 B2* | 3/2013 | Dasgupta | .............. | G06N 99/005 706/50 |
| 8,606,696 B1* | 12/2013 | Halpern | ................. | G06Q 40/02 379/91.01 |
| 8,843,827 B2* | 9/2014 | Koo | ...................... | H04W 4/206 715/735 |
| 8,887,095 B2* | 11/2014 | Krishnamurthy | .. | G06Q 30/0251 463/42 |
| 9,639,858 B2* | 5/2017 | Busch | ................... | H04W 4/029 |
| 2003/0061132 A1* | 3/2003 | Yu, Sr. | ................... | G06Q 30/02 705/30 |
| 2003/0216960 A1* | 11/2003 | Postrel | ................... | G06Q 30/02 705/14.26 |
| 2005/0176407 A1* | 8/2005 | Tuomi | ................... | H04L 63/083 455/411 |
| 2007/0073585 A1* | 3/2007 | Apple | ................... | G06Q 30/02 705/14.46 |
| 2007/0208618 A1* | 9/2007 | Paintin | ................... | G06Q 30/02 705/14.11 |
| 2008/0235243 A1* | 9/2008 | Lee | ................... | G06F 17/30867 |
| 2008/0262928 A1* | 10/2008 | Michaelis | .............. | G06Q 30/02 705/14.26 |
| 2009/0216579 A1* | 8/2009 | Zen | ....................... | G06Q 20/12 705/14.1 |
| 2009/0240538 A1* | 9/2009 | Sweeney | ................ | G06Q 30/00 705/14.69 |
| 2009/0327151 A1* | 12/2009 | Carlson | .................. | G06Q 30/02 705/80 |
| 2010/0042495 A1* | 2/2010 | Malden | .................. | G06Q 30/02 705/14.48 |
| 2010/0082629 A1* | 4/2010 | Davis | ................ | G06F 17/30528 707/741 |
| 2010/0145926 A1* | 6/2010 | Jeong | ..................... | G06Q 30/02 707/709 |
| 2010/0198772 A1* | 8/2010 | Silverman | .............. | G06Q 30/02 706/52 |
| 2010/0198826 A1* | 8/2010 | Petersen | ................ | G06Q 10/10 707/737 |
| 2011/0040655 A1* | 2/2011 | Hendrickson | .......... | G06Q 30/02 705/27.1 |
| 2011/0087916 A1* | 4/2011 | Yoo | ........................ | G06Q 30/02 714/2 |
| 2011/0191714 A1* | 8/2011 | Ting | ........................ | G06F 3/048 715/805 |
| 2011/0238476 A1* | 9/2011 | Carr | ........................ | G06Q 30/00 705/14.25 |
| 2011/0246267 A1* | 10/2011 | Williams | ................ | G06Q 30/02 705/14.4 |
| 2012/0046995 A1* | 2/2012 | Petersen | ............ | G06Q 30/0204 705/7.33 |
| 2012/0166272 A1* | 6/2012 | Wiley | ................ | G06Q 30/0246 705/14.45 |
| 2012/0221411 A1* | 8/2012 | Graham, Jr. | ........... | G06Q 30/02 705/14.52 |
| 2012/0265599 A1* | 10/2012 | Corner | ................... | G06Q 30/02 705/14.35 |
| 2012/0290389 A1* | 11/2012 | Greenough | ........ | G06Q 30/0261 705/14.53 |
| 2013/0085841 A1* | 4/2013 | Singleton | ................ | G06Q 30/02 705/14.45 |
| 2013/0124309 A1* | 5/2013 | Traasdahl | ............... | H04L 67/22 705/14.49 |
| 2013/0166376 A1* | 6/2013 | Cohen | .................... | G06Q 30/02 705/14.45 |
| 2014/0095297 A1* | 4/2014 | O'Reilly | ............ | G06Q 30/0246 705/14.45 |
| 2014/0200991 A1* | 7/2014 | Wu | .................... | G06Q 30/0246 705/14.45 |
| 2014/0207567 A1* | 7/2014 | Gould | ................ | G06Q 30/0246 705/14.45 |
| 2014/0365296 A1* | 12/2014 | McDonnell | ........ | G06Q 30/0246 705/14.45 |
| 2015/0235258 A1* | 8/2015 | Shah | .................. | G06Q 30/0242 705/14.45 |

OTHER PUBLICATIONS

International Preliminary Report on Patentability for PCT/US2015/043400 dated Feb. 21, 2017. (7 pages).

* cited by examiner

MATCHING CONVERSIONS FROM APPLICATIONS TO SELECTED CONTENT ITEMS

CROSS-REFERENCE TO RELATED APPLICATIONS

The present application claims the benefit of U.S. Provisional Patent Application No. 62/038,671, filed Aug. 18, 2014, entitled "MATCHING CONVERSIONS FROM APPLICATIONS TO SELECTED CONTENT ITEMS," the entirety of which is incorporated herein by reference.

BACKGROUND

In a networked environment, such as the Internet or other networks, first-party content providers can provide information for public presentation on resources, for instance webpages, documents, applications, and/or other resources. The first-party content can include text, video, and/or audio information provided by the first-party content providers via, for instance, a resource server for presentation on a client device over the Internet. The first-party content may be a webpage requested by the client device or a stand-alone application (e.g., a video game, a chat program, etc.) running on the client device. Additional third-party content can also be provided by third-party content providers for presentation on the client device together with the first-party content provided by the first-party content providers. For instance, the third-party content may be a public service announcement or advertisement that appears in conjunction with a requested resource, such as a webpage (e.g., a search result webpage from a search engine, a webpage that includes an online article, a webpage of a social networking service, etc.) or with an application (e.g., an advertisement within a game). Thus, a person viewing a resource can access the first-party content that is the subject of the resource as well as the third-party content that may or may not be related to the subject matter of the resource.

SUMMARY

Implementations described herein relate to matching conversions performed in an application of a third-party to interactions with content items presented with a resource via a web browser of a client device. For instance, a content item, such as an advertisement, for a company may be presented with a resource, such as a webpage, via a web browser of a client device. Responsive to an interaction with the content item (e.g., clicking on the content item), first data may be transmitted to a system for matching conversions performed in applications to interactions with content items presented with resources. The first data may include an account identifier and an application identifier for an application associated with the third-party of the content item. For instance, the company of the advertisement may also have a mobile application that may be installed and executed on the client device for interacting with the user of client device and/or completing transactions with the third-party.

In some instances, a user of the client device may not perform an action that constitutes a conversion using the webpage presented via the web browser of the client device responsive to the interaction with the content item. Instead, the user may choose to perform the action constituting a conversion using the application of the third-party, such as completing a purchase using a company's application, booking travel arrangements using the company's application, etc. When the action constituting a conversion is performed using the application of the third-party, second data is transmitted to the system for matching conversions performed in applications to interactions with content items presented with resources. The second data may include the application identifier for the application associated with the third-party of the content item and a device identifier for the client device.

Third data of the account identifier and the device identifier may also be transmitted responsive to or substantially concurrent with the conversion action. In other instances, the account identifier and the device identifier may be transmitted as third data at a later point in time relative to the transmission of the second data. The third data may be transmitted when a user of the client device access or logins into another application associated with the account identifier. The system for matching conversions performed in applications to interactions with content items presented with resources may match the second data with the first data based on the third data. Accordingly, conversions that result from usage of an application of the third-party can be matched with interactions with content items presented with resources displayed on a display of the client device, such as advertisements presented with webpages via a web browser of the client device.

One implementation relates to a method that includes receiving first data from a client device associated with an interaction with a content item displayed with a resource via a web browser of the client device. The first data includes an application identifier for an application associated with the content item and an account identifier. The method also includes receiving second data from the client device associated with a conversion using the application. The second data includes the application identifier and a device identifier for the client device. The method further includes receiving third data from the client device that includes the account identifier and the device identifier. The method still further includes determining the conversion is associated with the interaction with the content item displayed with the resource based on matching the second data with the first data based on the third data.

Another implementation relates to a system having one or more processors and one or more storage devices storing instructions that, when executed by the one or more processors, cause the one or more processors to perform several operations. The operations include receiving first data from a client device responsive to an interaction with a content item displayed with a resource displayed on a display of the client device. The first data includes an application identifier for an application associated with the content item, an account identifier, and a first timestamp. The operations also include receiving second data from the client device associated with a conversion using the application. The second data includes the application identifier, a device identifier for the client device, and a second timestamp. The operations further include receiving third data from the client device including the account identifier and the device identifier. The operations still further include determining the conversion is associated with the interaction with the content item displayed with the resource based on matching the second data with the first data based on the third data and a difference between the first timestamp and the second timestamp occurring within a predetermined period of time.

Yet a further implementation relates to a non-transitory computer readable storage device storing instructions that, when executed by one or more processors, cause the one or more processors to perform several operations. The operations include receiving first data from a mobile device associated with an interaction with a content item displayed with a resource displayed on a display of the mobile device. The first data includes an application identifier for a mobile application associated with the content item and an account identifier. The operations also include receiving second data from the mobile device associated with a conversion using the mobile application. The second data includes the application identifier and a device identifier for the mobile device. The operations further include receiving third data from the mobile device including the account identifier and the device identifier. The operations still further include determining the conversion is associated with the interaction with the content item displayed with the resource based on matching the second data with the first data based on the third data. The operations also include storing data for the determined conversion associated with the interaction with the content item in a database.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
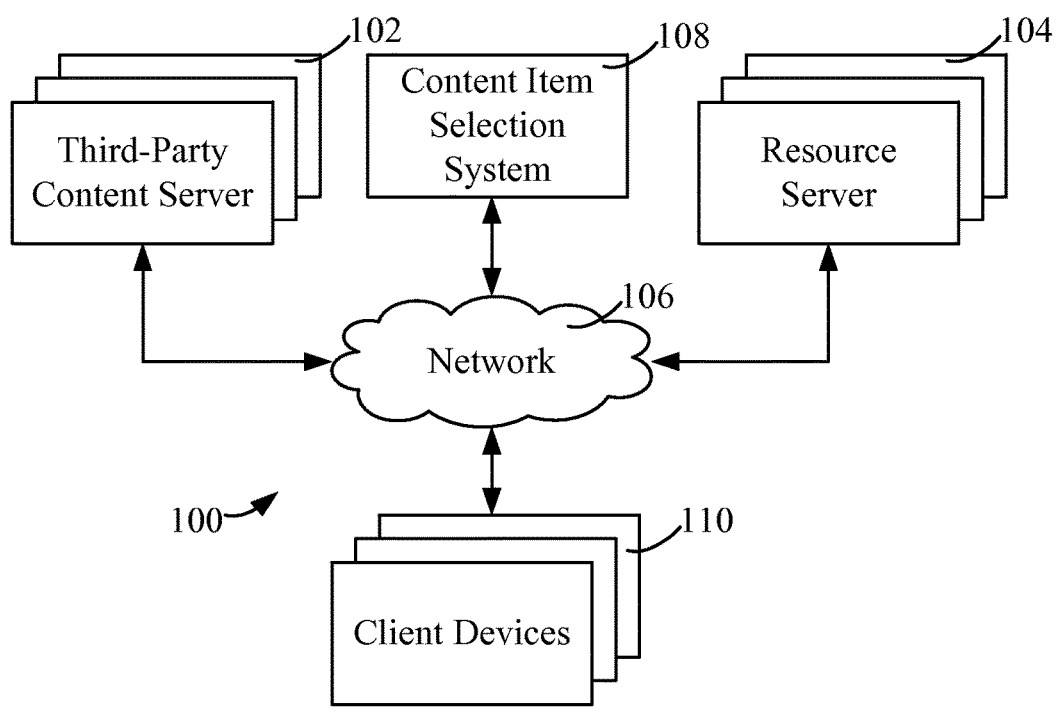
FIG. 1 is an overview depicting an implementation of a system for providing information via a computer network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to and implementations of, methods, apparatuses, and systems for matching conversions from applications on a client device to interactions with content items presented with resources displayed on a display of the client device. The various concepts introduced above and discussed in greater detail below may be implemented in any of numerous ways as the described concepts are not limited to any particular manner of implementation. Examples of specific implementations and applications are provided primarily for illustrative purposes.

I. Overview

A computing device (e.g., a client device) can view a resource, such as a webpage, a document, an application, etc. In some implementations, the computing device may access the resource via the Internet by communicating with a server, such as a webpage server, corresponding to that resource. The resource includes first-party content that is the subject of the resource from a first-party content provider and may also include additional third-party provided content, such as advertisements or other content. In one implementation, responsive to receiving a request to access a webpage, a webpage server and/or a client device can communicate with a data processing system, such as a content item selection system, to request a content item to be presented with the requested webpage, such as through the execution of code of the resource to request a third-party content item to be presented with the resource. The content item selection system can select a third-party content item and provide data to display the content item with the requested webpage on a display of the client device. In some instances, the content item is selected and served with a resource associated with a search query response. For instance, a search engine may return search results on a search results webpage and may include third-party content items related to the search query in one or more content item slots of the search results webpage.

The third-party content item may include a link that, when the third-party content item is interacted with, such as clicking on the content item, directs the computing device to retrieve and/or transmit data to the address indicated by the link. For instance, some content items may have a link to a webpage of the third-party of the third-party content item, a link to an application store or website to install an application of the third-party, and/or a link to the content item selection system to transmit data to the content item selection system, which then redirects the computing device to a subsequent destination, such as the webpage of the third-party of the third-party content item.

The computing device (e.g., a client device) may also be used to view or execute an application, such as a mobile application. The application may be an application for the third-party associated with the third-party content item. For instance, a travel company may have content items, such as advertisements, that may be presented with resources and may also have an application that can be installed and executed on the client device. Thus, users of the computing device may interact with the travel company via a landing webpage of the travel company via interaction with the content item of the travel company and/or via the application of the travel company.

In some instances, a user may initially interact with the content item, but does not perform an action that constitutes a conversion, such as completing a transaction, registering for a service, etc. Instead, the user may elect to utilize the application of the third-party to perform the action that constitutes a conversion. For instance, the third-party may not have a website that is optimized for mobile devices or completing transactions, so a user may prefer the mobile application to perform the action that constitutes a conversion. In other instances, the retrieved webpage may include code to detect whether the device has the application of the third-party installed and/or is capable of installing and executing the application on the device. Thus, prior to utilizing the webpage, a user of the device may elect to install and/or execute the application on the client device and may then perform the action that constitutes a conversion via the application. In still other implementations, a user of the device may initially browse the retrieved webpage and then elect to complete a transaction via the application.

In some instances, such as when content items are presented via a web browser, the method for linking a subsequent conversion involves setting a cookie or other identifier stored in a data structure in a storage device of the device when the content item is presented and/or interacted with such that, when a conversion event occurs via the web browser, the cookie or other identifier may be identified and used to link the conversion event to the presentation and/or interaction with the content item. When a conversion event occurs via an application, another device identifier may be used to link the conversion to the client device. However, in some instances, the cookie or other identifier for content items presented via a web browser is different from the device identifier used with conversion via the application. For instance, some operating systems of devices prevent or restrict access between the cookies or other identifier of a web browser and the device identifiers of applications. Accordingly, it may be useful to link the interaction with a content item presented with a resource on a device via a web browser to the conversion occurring via the application executing on the device.

In some instances, a device may be associated with a device identifier. In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the device identifier may be a universally unique device identifier (UDID), such as an identifier for advertisers (IDFA) or an AdID. In other implementations, the device identifier may be an identifier associated with hardware and/or software characteristics of the device, such as a mobile equipment identifier (MEID), international mobile equipment identifier (IMEI), integrated circuit card identifier (ICCID), device serial number, an identifier generated based on hardware and/or software characteristics of the device (e.g., an identifier based, at least in part, on an operating system version, device model, firmware version(s), installed application(s), memory capacity, and/or storage space), etc. Such a device identifier may be used as the cookie or other identifier when interacting with content items via a web browser of the device.

To link the interaction with the content item via the web browser to a conversion action performed using an application associated with a third-party of the content item, an application identifier for the application may be utilized to link the device identifier to an account identifier. The account identifier may be a login name, an obfuscated account identifier, a pseudorandom account identifier, an account number, etc. For instance, when a content item is interacted with by a user of the device, first data including the account identifier and the application identifier for the third-party's application may be transmitted to a system for matching conversions using applications to interactions with content items presented with resources. In some implementations, the account identifier is transmitted with the application identifier for devices in which the user is logged into the account associated with the account identifier via the web browser at the time of the interaction with the content item. In some implementations, the first data may further include a first timestamp indicative of a time when the interaction with the content item occurred. The first data may be stored in a database, such as a content item interaction database.

When an action constituting a conversion using the application occurs, such as completing a transaction, registering for a service, etc., the application may be configured to transmit second data to the system for matching conversions using applications to interactions with content items presented with resources. For instance, a portion of code may be provided to be included with the source code for the application that is configured to transmit the second data to the system for matching conversions using applications to interactions with content items presented with resources responsive to an action constituting a conversion occurring for the application. The second data may include the application identifier and a device identifier. In some implementations, the second data may further include a second timestamp indicative of a time when the conversion occurred. In some further implementations, the second data may include a monetary value and/or other metadata (e.g., a product SKU, a number of products purchased, etc.). The second data may be stored in a database, such as an application conversion database.

Substantially concurrent with or subsequent to the conversion via the application, third data including the account identifier and the device identifier may be transmitted to the system for matching conversions using applications to interactions with content items presented with resources. In some implementations, the account identifier and the device identifier may be transmitted substantially concurrent with the second data if the device is currently logged into the account associated with the account identifier via another application of the device. In other instances, the account identifier and the device identifier may be transmitted subsequent to the second data when the device next logs into the account associated with the account identifier or accesses an application associated with the account from the device.

The system for matching conversions using applications to interactions with content items presented with resources may utilize the third data to match the second data for the application conversion with the first data for the content item interaction. That is, the system for matching conversions using applications to interactions with content items presented with resources may match the account identifier of the third data with the account identifier of the first data and the device identifier of the third data with the device identifier of the second data. Information for the matched conversion with the interaction with the presented content item may be stored in a database, such as a matched conversion database. In some implementations, the information may simply include data indicative of the third-party, the content item, and that a conversion occurred. In some implementations, the information may further include a monetary value for the conversion and/or the other metadata (e.g., a product SKU, a number of products purchased, etc.). In some implementations, the first, second, and third data may be deleted once the information for the matched conversion with the interaction with the presented content item is stored in the database. Thus, any information about the client device may be deleted and only information pertinent to the third-party, the content item, and the conversion may be stored.

In some instances, a number of application conversions may be calculated for a third-party by aggregating the matched conversions with the interactions with presented third-party content items. In some implementations, an estimated total conversion amount may be calculated based, at least in part, on the number of application conversions and a login rate. The login rate may be based on a login in rate of devices when the content item is interacted with (i.e., the number of devices logged into an account when a content item is interacted with via the web browser divided by the total number of content item interactions) and a percentage of devices with applications associated with the account (i.e., a percentage of devices for a particular operating system that have one or more applications associated with the account). Thus, the estimated total conversion amount (ETC) may be defined as:

$$ETC = \frac{\text{\# Application Conversions}}{\text{Login Rate}}$$

where

Login Rate=(% Devices$_{Interaction}$)(% Devices$_{Application}$)

where % Devices$_{Interaction}$ is the fractional amount of devices that are logged into an account for the account identifier via the web browser at the time of the interaction with a content item (e.g., 0.3 for 30% of devices are logged to an account for the account identifier) and % Devices$_{Application}$ is the fractional amount of devices that are known or estimated to have applications installed that are associated with an account for the account identifier. In some implementations, the estimated total conversion amount may be separated by operating system.

In some implementations, an aggregate or an average value may be calculated based on the matched conversions to interactions with content items. For instance, the monetary values of conversions may be aggregated and an aggregate value for all the application conversions may be determined. In some instances, an estimated total conversion value may be determined using the aggregated application conversion values and the login rate. In some implementations, the estimated total conversion value may be separated by operating system. In still further implementations, an average application conversion value may be calculated by taking an average of the monetary values for all the application conversions.

While the foregoing has provided an overview of matching conversions to presentation of content items with resources, more specific implementations and systems to implement such a system will now be described.

II. Overview of an Implementation of a System for Providing Information Via a Computer Network FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system or processing module, such as a content item selection system 108. The content item selection system 108 can include at least one logic device, such as a computing device having a data processor, to communicate via the network 106, for instance with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, Java®, ActionScript®, JavaScript®, JSON, Perl®, HTML, HTML5, XML, Python®, and Visual Basic®. The processing module may process instructions and provide data to display one or more content items to the resource server 104 and/or the client device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to display one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, a business application, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device 110 executing the instructions from the web browser application may request data from another device connected to the network 106 referred to by the URL address (e.g., a resource server 104). The other device may then provide webpage data and/or other data to the client device 110, which causes visual indicia to be displayed by the display of the client device 110. Accordingly, the browser window displays the retrieved first-party content, such as webpages from various websites, to facilitate interaction with the first-party content.

In some implementations, the client device 110 may also be used to view or execute an application other than a web browser. The application may be an application for a third-party associated with a third-party content item. For instance, a travel company may have content items, such as advertisements, that may be presented with resources and may also have an application that can be installed and/or executed on the client device 110. Thus, users of the client device 110 may interact with the travel company via a landing webpage of the travel company via the web browser and/or via the application of the travel company.

The resource server 104 can include a computing device, such as a server, configured to host a resource, such as a webpage or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to display a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for instance, graphical, text, image, audio, video, etc. The content items may also be a combination (hybrid) of the formats. The content items may be banner content items, interstitial content items, pop-up content items, rich media content items, hybrid content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a webpage. The client device 110 may be a computing device operated by a user, which, when accessing a resource of the resource server 104, can make a request to the content item selection system 108 for content items to be presented with the resource, for instance.

The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). The information or parameters that the content item selection system 108 receives can include a HyperText Transfer Protocol (HTTP) cookie can contain a form of device identifier (e.g., a random number) that represents the client device 110. In some implementations, the device and/or the resource information or parameters may be appended to a content item request URL (e.g., /page/contentitem?devid=abc123&devnfo=A34r0). In some implementations, the device and/or the resource information or parameters may be encoded prior to being appended to the content item request URL. The requesting device and/or the resource information or parameters may be utilized by the content item selection system 108 to select third-party content items to be served with the requested resource and presented on a display of a client device 110.

In some instances, a resource of a resource server 104 may include a search engine feature. The search engine feature may receive a search query (e.g., a string of text) via an input feature (an input text box, etc.). The search engine may search an index of documents (e.g., other resources, such as webpages, etc.) for relevant search results based on the search query. The search results may be transmitted as a second resource to present the relevant search results, such as a search result webpage, on a display of a client device 110. The search results may include webpage titles, hyperlinks, etc. One or more third-party content items may also be presented with the search results in a content item slot of the search result webpage. Accordingly, the resource server 104 and/or the client device 110 may request one or more content items from the content item selection system 108 to be presented in the content item slot of the search result webpage. The content item request may include additional information, such as the client device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For instance, the third-party content provider may set bid values and/or selection criteria via a user interface that may include one or more content item conditions or constraints regarding the serving of content items. A third-party content provider may specify that a content item and/or a set of content items should be selected and served for client devices 110 associated with a certain geographic location or region, a certain language, a certain operating system, a certain web browser, etc. In another implementation, the third-party content provider may specify that a content item or set of content items should be selected and served when the resource, such as a webpage, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item (i.e., a conversion), whether the third-party content item is selected and served, and/or other types of bids.

III. Implementations of Interaction with Content Items and In-Application Conversions While the foregoing has provided an overview of a system 100 for selecting and serving content items to client devices 110, implementations of displaying selected and served content items on a client device and in-application conversions will now be described in reference to FIGS. 2A-2B.

Figure 2A:
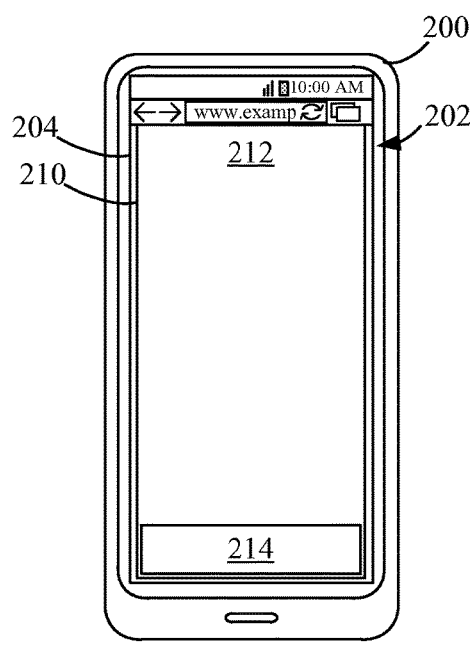
FIG. 2A is an illustration of an implementation of a first-party resource displayed on a display of a mobile client device and having third-party content.

FIG. 2A depicts a mobile client device 200, such as a smartphone or tablet, on which a resource 210 may be displayed by a display 202 of the client device 200. In the implementation depicted in FIG. 2A, the resource 210 is a webpage displayed via a mobile web browser 204 executing on the client device 200. In some implementations, the client device 200 may execute code for the resource 210 to display first-party content 212 (e.g., a webpage or website) on the display 202 of the client device 200 via the mobile web browser 204. In some implementations, the resource 210 may also include code to request one or more third-party content items 214 to be presented with the first-party content 212. In response, one or more processors of the client device 200 executing the instructions may request data from another device (e.g., a content item selection system 108) connected to a network, such as network 106. The other device may then provide data to display the third-party content item 214 to the client device 200, which causes visual indicia to be displayed by the display 202 of the client device 200.

In some instances, a user of the client device 200 may interact with the third-party content item 214. The interaction with the third-party content item 214 may include a link associated with the third-party content item 214. The link may be a direct link to a third-party resource, such as a webpage associated with the third-party content item 214 and/or a main webpage for the third-party of the third-party content item 214. Upon interaction with the third-party content item 214, the mobile web browser 204 may retrieve data for the webpage of the link. In some instances, the link associated with the third-party content item 214 may initially cause the web browser 204 to transmit data to the content selection system 108 responsive to an interaction with the third-party content item 214. For instance, the link may link to the content selection system 108 or a system associated with the content selection system 108 and may append or include data to the link. Thus, when the mobile web browser 204 sends a request to the link to the content selection system 108 or a system associated with the content selection system 108, the content selection system 108 or a system associated with the content selection system 108 may store the data included with the requested link. The content selection system 108 or a system associated with the content selection system 108 may then transmit data to the client device 200 to redirect the mobile web browser 204 to the webpage associated with the third-party content item 214. The mobile web browser 204 may then be redirected to retrieve data for the webpage after transmitting the data to the content selection system 108.

The transmitted data may include first data that includes an account identifier associated with the client device 200. For instance, when the web browser is executing on the client device 200, a user of the client device 200 may be logged into an account for one or more services via the web browser (e.g., an e-mail service, a media service, etc.). The account may be associated with an account identifier, such as a login name, an obfuscated account identifier, a pseudorandom account identifier, an account number, etc. The first data may also include an application identifier associated with an application of the third-party of the third-party content item 214. That is, in some instances, a third-party of the third-party content item 214 may also have an application that may be installed and/or executed by the client device 200 (e.g., a mobile application). The application identifier may be an identifier to identify the application in an application store or other application management system. In some implementations, the first data may further include a first timestamp with the account identifier and/or application identifier. The first timestamp may be a coordinated universal time (UTC) timestamp.

Figure 2B:
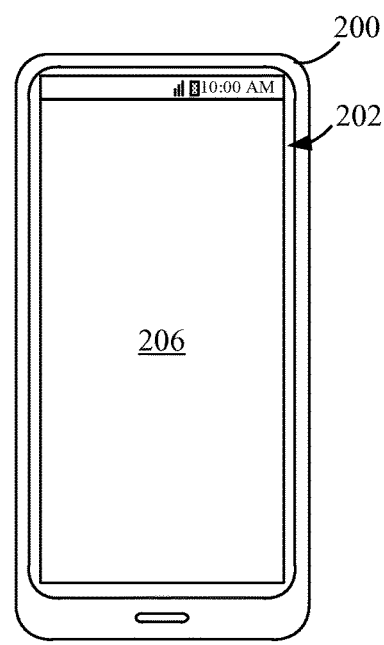
FIG. 2B is an illustration of the mobile client device of FIG. 2A displaying an application of a third-party on the display of the mobile client device.

Although the interaction with the third-party content item 214 may direct the mobile web browser 214 to retrieve data for a webpage associated with the third-party content item 214, in some instances, a user of the client device 200 may elect to utilize the application associated with the application identifier instead of the retrieved webpage. For instance, a third-party content item 214 for a travel website may direct a client device to the travel company's website. However, the travel company may also provide an application that may be installed and/or executed on the client device 200 separately from the web browser. FIG. 2B depicts the client device 200 of FIG. 2A executing an application 206 of the third-party. In some instances, the application 206 may be utilized instead of the webpage as a result of the interaction with the third-party content item 214 of FIG. 2A. For instance, the retrieved webpage may not be optimized for viewing or completing transactions on a mobile client device 200, so the application 206 may be preferred. In other instances, the retrieved webpage may include code to detect whether the client device 200 has the application 206 installed and/or is capable of installing and executing the application 206. Thus, prior to utilizing the webpage, a user of the client device 200 may elect to install and/or execute the application 206 on the client device 200. In still other implementations, a user of the client device 200 may initially browse the retrieved webpage and then elect to complete a transaction via the application 206.

When an action that constitutes a conversion occurs via the application 206, the application may include code configured to cause the client device 200 to transmit second data to the content selection system 108 or a system associated with the content selection system 108. For instance, when a conversion, such as a purchase transaction, a booking transaction, a service sign-up, etc., occurs via the application 206 executing on the client device 200 may transmit the second data to the content selection system 108 or a system associated with the content selection system 108. The second data may include the application identifier for the application 206 and a device identifier. In some implementations, the second data may further include a second timestamp indicative of a time when the conversion occurred. The second timestamp may also be a coordinated universal time (UTC) timestamp. In some further implementations, the second data may include a monetary value and/or other metadata (e.g., a product SKU, a number of products purchased, etc.).

In some instances, the client device 200 may also transmit third data to the content selection system 108 or a system associated with the content selection system 108 substantially concurrent with or subsequent to the conversion via the application 206. The third data may include the account identifier and the device identifier. In some implementations, the account identifier and device identifier may be substantially concurrently transmitted with the second data if the client device 200 is currently logged into the account associated with the account identifier via another application executing on the client device 200 (e.g., an e-mail application, a search application, a media application, etc.). In other instances, the account identifier and the device identifier may be transmitted subsequent to the second data when the client device 200 next logs into the account associated with the account identifier or executes the other application associated with the account from the client device 200.

Figure 3:
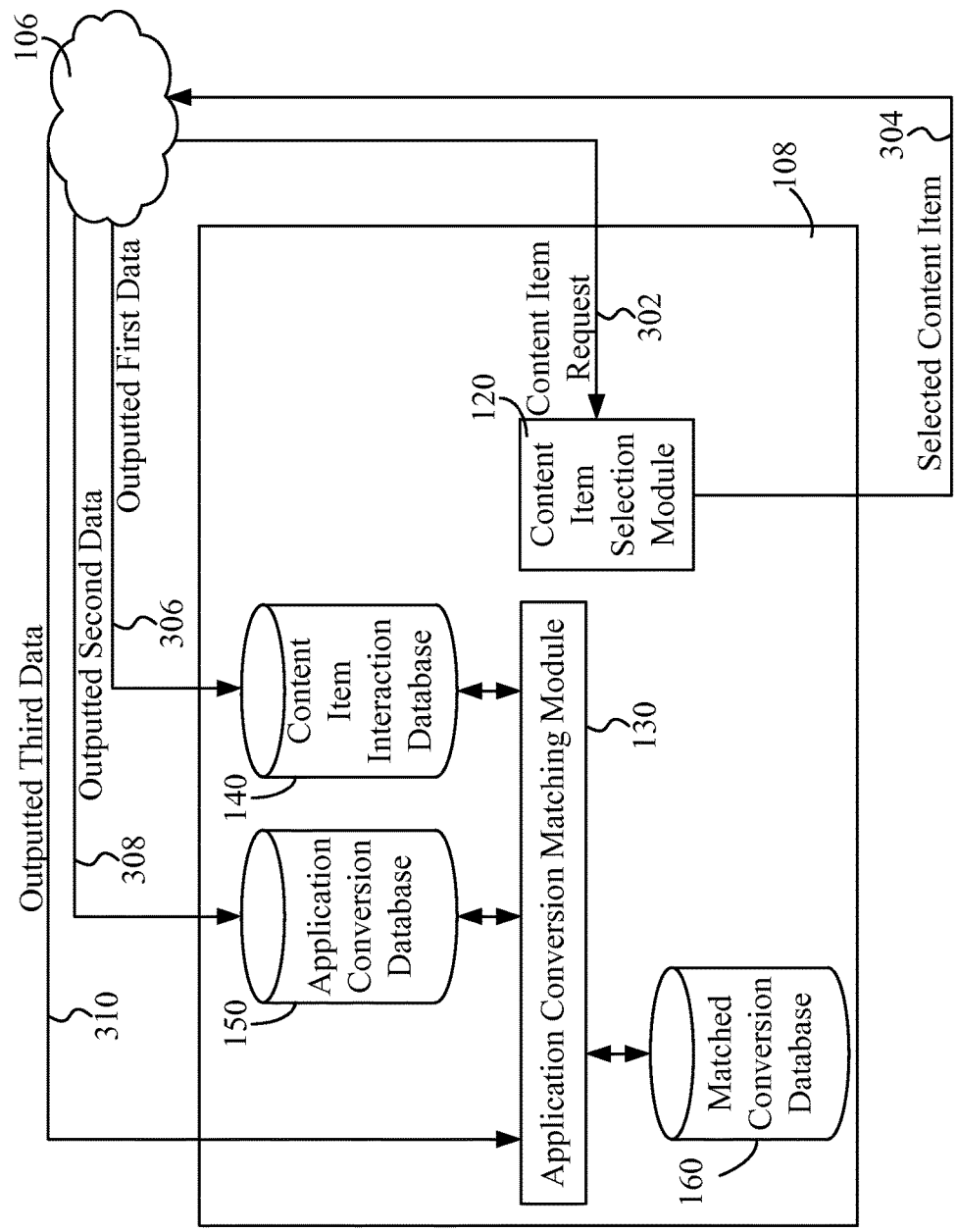
FIG. 3 is a block diagram of an implementation of a system for matching conversions from applications with interactions with content items presented with resources.

IV. Overview of an Implementation of a System for Matching Conversions from Applications to Interactions with Content Items FIG. 3 is a block diagram of an implementation of a portion of the content item selection system 108 of FIG. 1 that includes a content item selection module 120 and an application conversion matching module 130. The content item selection system 108 also includes one or more databases, such as a content item interaction database 140, an application conversion database 150, and/or a matched conversion database 160.

The databases 140, 150, 160 may store data for and/or provide data to the application conversion matching module 130. The databases 140, 150, 160 may include a static storage device, such as ROM, solid state drive (SSD), flash memory (e.g., EEPROM, EPROM, etc.), magnetic disc, optical disc, etc., a plurality of static storage devices, a cloud storage system, a server, and/or any other electronic device capable of storing and providing data. While the implementation shown in FIG. 3 depicts the databases 140, 150, 160 as separate databases, it should be understood that the databases 140, 150, 160 may be combined into a single database or sets of databases.

The content item selection module 120 is configured to receive a content item request 302 via the network 106. A client device, such as client device 110 of FIG. 1 or client device 200 of FIGS. 2A-2B, or a resource server, such as resource server 104, may send the content item request 302 to the content item selection system 108 via the network 106. The content item request 302 may include one or more parameters representative of characteristics of the client device (e.g., a unique identifier associated with the client device, a type of client device, a display type of a client device, dimensions of the display, etc.) and/or characteristics of a resource with which the content item is to be presented (e.g., a URL of the resource, one or more keywords of the content of the resource, text of the content of the resource, a title of the resource, a category of the resource, a type of the resource, a property of the resource, an interactivity level of the resource, a ranking of the resource, a popularity of the resource, a category of a publisher associated with the resource, a type of a publisher associated with the resource, a property of a publisher associated with the resource, etc.). In some implementations, the foregoing parameters may be appended to or included in a content item request URL (e.g., /page/contentitem?devid=abc123&devnfo=A34r0).

Responsive to the content item request 302, the content item selection module 120 is configured to select and serve a content item 304. In some implementations, the content item selection module 120 is configured to perform an auction. That is, the content item selection module 120 may generate one or more values, such as scores, for one or more content items based, at least in part, on the content item request 302, and select one or more content items to be served. In some instances, the content item selection module 120 ranks the values (e.g., highest to lowest) and selects the content item associated with a value based on the ranking (e.g., selecting the content item associated with the highest ranked value or score).

Data to display the selected content item 304 may be transmitted or served by the content item selection module 120 to the client device and/or the resource server via the network 106. The data can include graphical data, textual data, image data, audio data, video data, etc. that may be accessed from a database.

As discussed above in reference to FIG. 2A, a user of the client device may interact with the content item. The interaction with the content item may include a link associated with the third-party content item that initially causes a web browser of the client device to transmit data to the content selection system 108 responsive to an interaction with the content item. Thus, when a user of the client devices interacts with the content item, such as clicking on the content item, the web browser of the client device may send a request to the content item selection system 108 based on the link associated with the third-party content item. The link may include first data that can be appended to the link as parameters (e.g., /page/contentitem?firstdata=abc123). Thus, the content selection system 108 can receive outputted first data 306 from the client device responsive to the interaction with the content item. The content selection system 108 can store the outputted first data 306 in a content item interaction database 140. In some implementations, the content selection system 108 can then transmit data to the client device to redirect the web browser of the client device to the webpage associated with the content item. The web browser of the client device may then be redirected to retrieve data for the webpage after transmitting the first data to the content selection system 108.

The outputted first data 306 includes an identifier associated with the client device, such as an account identifier. For instance, when the web browser is executing on the client device the user of the client device may be logged into an account for one or more services via the web browser (e.g., an e-mail service, a media service, etc.). Thus, when the user interacts with the content item, an account identifier for the account may be included in the first data transmitted to the content item selection system 108 The account identifier may be a login name, an obfuscated account identifier, a pseudorandom account identifier, an account number, etc. The first data may also include an application identifier associated with an application of the third-party of the content item. That is, in some instances, a third-party of the content item may also have an application that may be installed and/or executed by the client device (e.g., a mobile application). The application identifier may be an identifier to identify the application in an application store or other application management system. In some implementations, the first data may further include a first timestamp with the account identifier and/or application identifier. The first timestamp may be a coordinated universal time (UTC) timestamp.

The content item selection system 108 may also receive outputted second data 308 via network 106 from a client device. When an action that constitutes a conversion occurs via the application of the third-party of the content item, the application may include code configured to cause the client device to transmit second data to the content selection system 108. A conversion can be any defined action, such as a purchase transaction, a booking transaction, a service sign-up, etc. When the conversion occurs via the application executing on the client device, then the client device may transmit the second data to the content selection system 108. The second data may include the application identifier for the application and a device identifier for the client device that is different from the account identifier. In some implementations, the second data may further include a second timestamp indicative of a time when the conversion occurred. The second timestamp may be a coordinated universal time (UTC) timestamp. In some further implementations, the second data may include a monetary value and/or other metadata (e.g., a product SKU, a number of products purchased, etc.). The content selection system 108 can store the outputted second data 308 in an application conversion database 150.

The content selection system 108 can also receive outputted third data 310 via the network 106 from the client device. The outputted third data 310 may be received by the content item selection system 108 substantially concurrent with or subsequent to the conversion via the application executing on the client device. The third data may include the account identifier and the device identifier. In some implementations, the account identifier and device identifier may be substantially concurrently transmitted with the second data if the client device is currently logged into the account associated with the account identifier via another application executing on the client device (e.g., an e-mail application, a search application, a media application, etc.). In other instances, the account identifier and device identifier may be transmitted subsequent to the second data when the client device next logs into the account associated with the account identifier or executes the other application associated with the account from the client device. In some implementations, the outputted third data 310 may be stored in a database or may be utilized by the application conversion matching module 130 without storing the outputted third data 310 in a database.

Responsive to receiving the outputted third data 310, the application conversion matching module 130 is configured to query the application conversion database 150 and the content item interaction database 140. The application conversion matching module 130 may initially query the content item interaction database 140 using the account identifier of the outputted third data 310 to retrieve stored first data in the content item interaction database 140 that includes that same account identifier. In some implementations, the stored first data in the content item interaction database 140 may be stored in as data in a data table. The data for any of the matching entries of first data, such as the account identifier, the application identifier, and/or the timestamp, stored in the content item interaction database 140 may be returned to the application conversion matching module 130 responsive to the query.

The application conversion matching module 130 may then use the application identifier of each matching entry of first data to query the application conversion database 150. For instance, the application conversion matching module 130 queries the application conversion database 150 using the device identifier of the outputted third data 310 and the application identifier of each matching entry of first data to retrieve any stored second data in the application conversion database 150 that includes the same device identifier and the same application identifier. In some implementations, the stored second data in the application conversion database 150 may be stored in as data in a data table. The data for any of the matching entries of second data, such as the device identifier, the application identifier, the timestamp, the monetary value, and/or other metadata, stored in the application conversion database 150 may be returned to the application conversion matching module 130 responsive to the query.

In some implementations, the application conversion matching module 130 may compare the timestamp from the first data (i.e., the first timestamp) to the timestamp from the second data (i.e., the second timestamp) to determine a difference between the timestamps. In some instances, the difference between the timestamps may be compared to a predetermined period of time, such as one minute, five minutes, ten minutes, thirty minutes, an hour, two hours, three hours, four hours, five hours, six hours, twelve hours, one day, two days, three days, one week, etc. Thus, the application conversion matching module 130 may determine whether the application conversion of the second data occurred within the predetermined period of time relative to the interaction with the content item of the first data. If the application conversion does not occur within the predetermined period of time relative to the interaction with the content item, then the application conversion matching module 130 can filter the application conversion out as occurring independent of or not influenced by the interaction with the content item.

In some implementations, the application conversion matching module 130 may generate or store data indicative of the matched application conversion associated with the interaction with a content item. For instance, the application conversion matching module 130 may store the application identifier, the device identifier, the timestamps, the monetary value, and/or the other metadata in the matched conversion database 160. The application conversion matching module 130 may aggregate the matched application conversions for the third-party in the matched conversion database 160 or may store the matched conversion separately in the matched conversion database 160.

In some implementations, the matched conversion data stored in the matched conversion database 160 can be used to generate data for a report, such as calculating a number of application conversions, calculating an estimated total conversion amount, calculating an aggregate monetary value for the application conversions, calculating an average monetary value for the application conversions, calculating an average time to conversion using the timestamps for the application conversions, etc.

Figure 4:
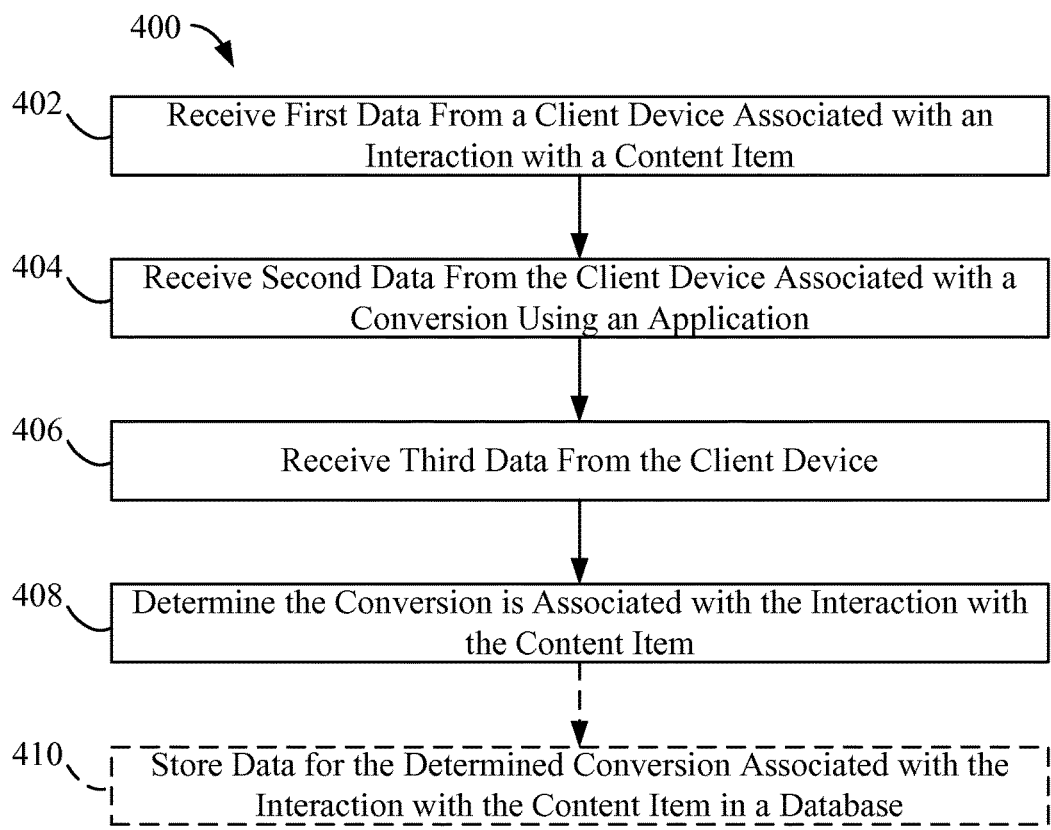
FIG. 4 is a flow diagram of an implementation of a process for matching conversions from applications with interactions with content items presented with resources.
Figure 5:
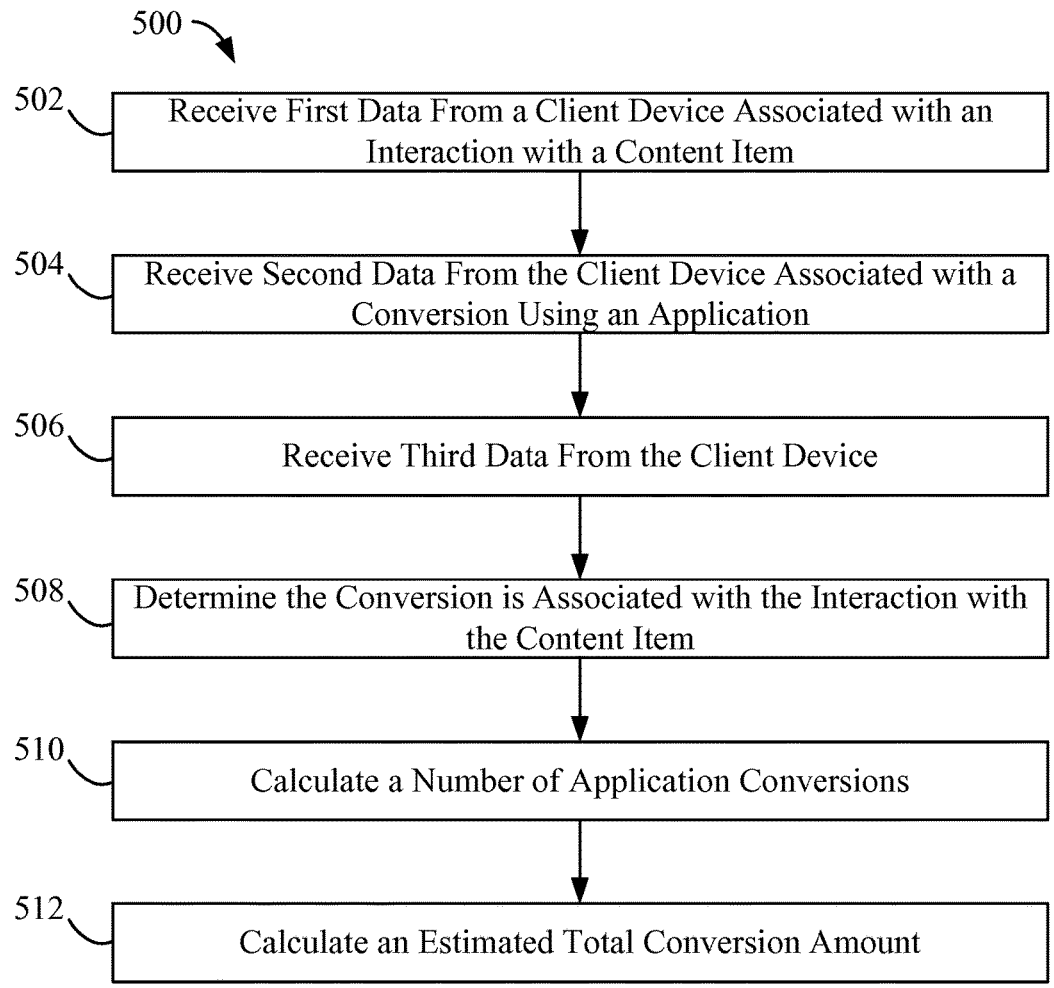
FIG. 5 is a flow diagram of another implementation of a process for matching conversions from applications with interactions with content items presented with resources and calculating an estimated total conversion amount.
Figure 6:
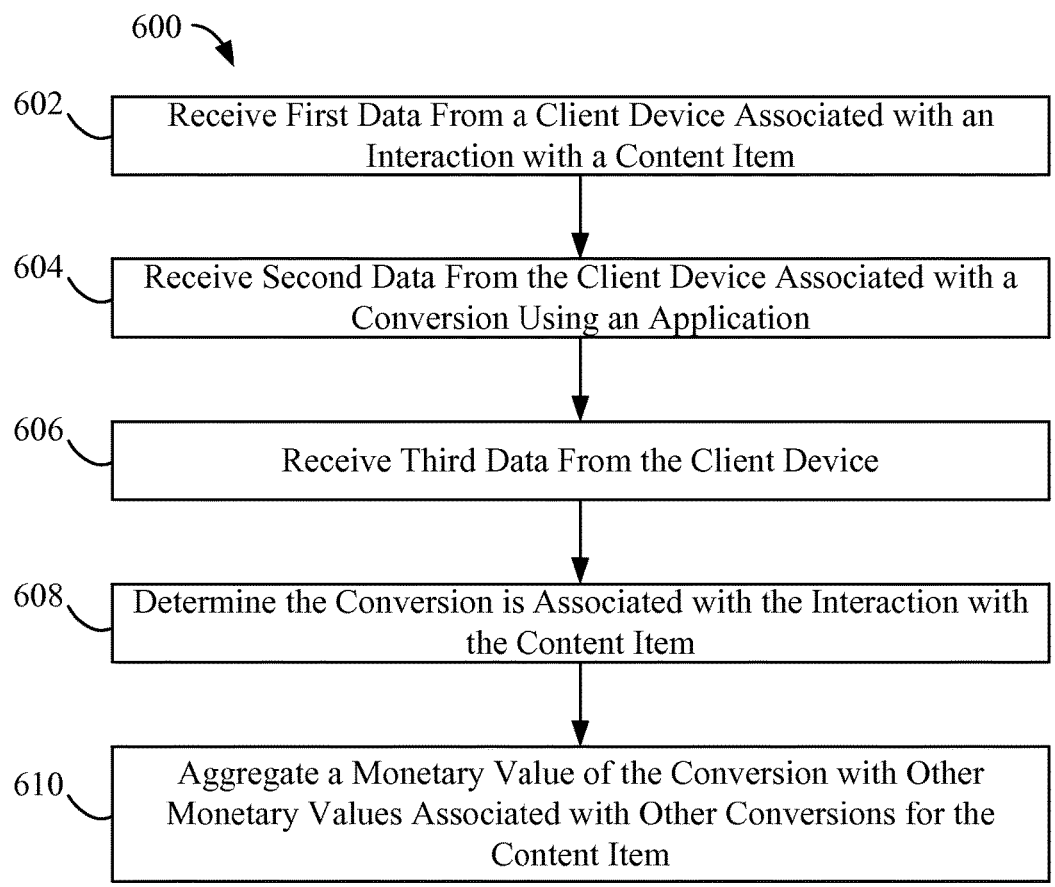
FIG. 6 is a flow diagram of still another implementation of a process for matching conversions from applications with interactions with content items presented with resources and aggregating monetary values for conversions for the content item.

V. Implementations of Processes for Matching In-Application Conversions with Interactions with Content Items FIGS. 4-6 depict processes 400, 500, 600 that may be implemented by the content item selection system 108 and/or the application conversion matching module 130. FIG. 4 depicts an implementation of a process 400 that may be used by the application conversion matching module 130 for matching conversions from applications on a client device to interactions with content items presented with resources displayed on a display of the client device. In brief overview, as shown in FIG. 4, such a process 400 includes receiving first data from a client device associated with an interaction with a content item (block 402), receiving second data from the client device associated with a conversion using an application (block 404), receiving third data from the client device (block 406), determining the conversion is associated with the interaction with the content item (block 408), and storing data for the determined conversion associated with the interaction with the content item in a database (block 410).

The process 400 includes receiving first data from a client device associated with an interaction with a content item (block 402). When a user of the client devices interacts with a content item, such as clicking on the content item, the web browser of the client device may send a request to the content item selection system based on the link associated with the content item. The link may include the first data that can be appended to the link as parameters (e.g., /page/contentitem?firstdata=abc123). Thus, the content selection system can receive the first data from the client device responsive to the interaction with the content item. The content selection system can store the first data in a content item interaction database. The first data includes an identifier associated with the client device, such as an account identifier. For instance, when the web browser is executing on the client device the user of the client device may be logged into an account for one or more services via the web browser (e.g., an e-mail service, a media service, etc.). Thus, when the user interacts with the content item, an account identifier for the account may be included in the first data transmitted to the content item selection system. The account identifier may be a login name, an obfuscated account identifier, a pseudorandom account identifier, an account number, etc. The first data may also include an application identifier associated with an application of the third-party of the selected content item. That is, in some instances, a third-party of the content item may also have an application that may be installed and/or executed by the client device (e.g., a mobile application). The application identifier may be an identifier to identify the application in an application store or other application management system. In some implementations, the first data may further include a first timestamp with the account identifier and/or application identifier. The first timestamp may be a coordinated universal time (UTC) timestamp.

The process 400 also includes receiving second data from the client device associated with a conversion using an application (block 404). For instance, the content item selection system may receive second data via a network from the client device. When an action that constitutes a conversion occurs via the application of the third-party of the content item, the application may include code configured to cause the client device to transmit second data to the content selection system. A conversion can be any defined action, such as a purchase transaction, a booking transaction, a service sign-up, etc. When the conversion occurs via the application executing on the client device, then the client device may transmit the second data to the content selection system. The second data may include the application identifier for the application and a device identifier for the client device that is different from the account identifier. In some implementations, the second data may further include a second timestamp indicative of a time when the conversion occurred. The second timestamp may be a coordinated universal time (UTC) timestamp. In some further implementations, the second data may include a monetary value and/or other metadata (e.g., a product SKU, a number of products purchased, etc.). The content selection system can store the second data in an application conversion database.

The process 400 further includes receiving third data from the client device (block 406). The content selection system can also receive outputted third data via the network from the client device. The outputted third data may be received by the content item selection system substantially concurrent with or subsequent to the conversion via the application. The third data may include the account identifier and the device identifier. In some implementations, the account identifier and device identifier may be substantially concurrently transmitted with the second data if the client device is currently logged into the account associated with the account identifier via another application executing on the client device (e.g., an e-mail application, a search application, a media application, etc.). In other instances, the account identifier and the device identifier may be transmitted subsequent to the second data when the client device next logs into the account associated with the account identifier or executes the other application associated with the account from the client device. In some implementations, the third data may be stored in a database or may be utilized by the application conversion matching module without storing the outputted third data in a database.

The process 400 still further includes determining the conversion is associated with the interaction with the content item (block 408). For instance, the application conversion matching module of the content item selection system may be configured to query the application conversion database and the content item interaction database. The application conversion matching module may query the content item interaction database using the account identifier of the third data to retrieve any stored first data in the content item interaction database that includes that same account identifier. The data for any of the matching entries of first data, such as the account identifier, the application identifier, and/or the timestamp, stored in the content item interaction database may be returned to the application conversion matching module responsive to the query.

The application conversion matching module may use the application identifier of each matching entry of first data and the device identifier of the third data to query the application conversion database. For instance, the application conversion matching module queries the application conversion database using the device identifier of the third data and the application identifier of each matching entry of first data to retrieve any stored second data in the application conversion database that includes the same device identifier and the same application identifier. The data for any of the matching entries of second data, such as the device identifier, the application identifier, the timestamp, the monetary value, and/or other metadata, stored in the application conversion database may be returned to the application conversion matching module responsive to the query.

In some implementations, the application conversion matching module may compare the timestamp from the first data (i.e., the first timestamp) to the timestamp from the second data (i.e., the second timestamp) to determine a difference between the timestamps. In some instances, the difference between the timestamps may be compared to a predetermined period of time, such as one minute, five minutes, ten minutes, thirty minutes, an hour, two hours, three hours, four hours, five hours, six hours, twelve hours, one day, two days, three days, one week, etc. Thus, the application conversion matching module may determine whether the application conversion of the second data occurred within the predetermined period of time relative to the interaction with the content item of the first data. If the application conversion does not occur within the predetermined period of time relative to the interaction with the content item, then the application conversion matching module can filter the application conversion out as occurring independent of or not influenced by the interaction with the content item.

In some implementations, process 400 may also include storing data for the determined conversion associated with the interaction with the content item in a database (block 410). For instance, the application conversion matching module may store data indicative of the matched application conversion associated with the interaction with a content item. The application conversion matching module may also store the application identifier, the device identifier, the timestamps, the monetary value, and/or the other metadata in a matched conversion database. The application conversion matching module may aggregate the matched application conversions for the third-party in the matched conversion database or may store the matched conversion separately in the matched conversion database.

FIG. 5 depicts an implementation of a process 500 that may be used by the application conversion matching module 130 for matching conversions from applications on a client device to interactions with content items presented with resources displayed on a display of the client device and to calculate an estimated total conversion amount. In brief overview, as shown in FIG. 5, such a process 500 includes receiving first data from a client device associated with an interaction with a content item (block 502), receiving second data from the client device associated with a conversion using an application (block 504), receiving third data from the client device (block 506), determining the conversion is associated with the interaction with the content item (block 508), calculating a number of application conversions (block 510), and calculating an estimated total conversion amount (block 512).

The receiving of first data from a client device associated with an interaction with a content item (block 502), receiving of second data from the client device associated with a conversion using an application (block 504), receiving of third data from the client device (block 506), and determining the conversion is associated with the interaction with the content item (block 508) may be performed substantially in accordance with the receiving of first data from a client device associated with an interaction with a content item (block 402), receiving of second data from the client device associated with a conversion using an application (block 404), receiving of third data from the client device (block 406), and determining the conversion is associated with the interaction with the content item (block 408) of the process 400 of FIG. 4.

The process 500 further includes calculating a number of application conversions (block 510). The calculation of the number of application conversions may include aggregating the matched application conversions for the third-party in the matched conversion database to calculate the number of application conversions for the third-party.

The process 500 further includes calculating an estimated total conversion amount (block 512). The estimated total conversion amount may be calculated based, at least in part, on the number of application conversions and a login rate. The login rate may be based on a login in rate of devices when the content item is selected (i.e., the number of devices logged into an account when a content item is interacted with via the web browser divided by the total number of content item interactions) and a percentage of devices with applications associated with the account (i.e., a percentage of devices for a particular operating system that have one or more applications associated with the account). Thus, the estimated total conversion amount (ETC) may be defined as:

$$ETC = \frac{\text{\# Application Conversions}}{\text{Login Rate}}$$

where

Login Rate=(% Devices$_{Interaction}$)(% Devices$_{Application}$)

where % Devices$_{Interaction}$ is the fractional amount of devices that are logged into an account for the account identifier via the web browser at the time of the interaction with a content item (e.g., 0.3 for 30% of devices that are logged to an account for the account identifier) and % Devices$_{Application}$ is the fractional amount of devices that are known or estimated to have applications installed that are associated with an account for the account identifier. In some implementations, the estimated total conversion amount may be separately calculated for differing operating systems, by differing geographic regions (e.g., city, state, country, continent, etc.), by device type, etc.

In some implementations, the estimated total conversion amount may be used to calculate an aggregated application conversion value using an average of the monetary values for the matched conversions to interactions with content items. The aggregate application conversion value may be separately calculated for differing operating systems, by differing geographic regions (e.g., city, state, country, continent, etc.), by device type, etc.

In some implementations, the calculating of a number of application conversions (block 510) and calculating of an estimated total conversion amount (block 512) may be included as part of process 400 and/or process 600.

FIG. 6 depicts an implementation of a process 600 that may be used by the application conversion matching module 130 for matching conversions from applications on a client device to interactions with content items presented with resources displayed on a display of the client device and to aggregate monetary values for conversions for the content item. In brief overview, as shown in FIG. 6, such a process 600 includes receiving first data from a client device associated with an interaction with a content item (block 602), receiving second data from the client device associated with a conversion using an application (block 604), receiving third data from the client device (block 606), determining the conversion is associated with the interaction with the content item (block 608), and aggregate a monetary value of the conversion with other monetary values associated with other conversions for the content item (block 610).

The receiving of first data from a client device associated with an interaction with a content item (block 602), receiving of second data from the client device associated with a conversion using an application (block 604), receiving of third data from the client device (block 606), and determining the conversion is associated with the interaction with the content item (block 608) may be performed substantially in accordance with the receiving of first data from a client device associated with an interaction with a content item (block 402), receiving of second data from the client device associated with a conversion using an application (block 404), receiving of third data from the client device (block 406), and determining the conversion is associated with the interaction with the content item (block 408) of the process 400 of FIG. 4.

The process 600 further includes aggregating a monetary value of the conversion with other monetary values associated with other conversions for the content item (block 610). That is, once the application conversion matching module matches the application conversion as associated with an interaction with a content item, the application conversion matching module may aggregate a monetary value, such as that included in the second data, with other monetary values or an aggregate monetary value associated with other conversions for the content item for the third-party, such as other monetary values or an aggregate monetary value stored in a matched conversion database or other monetary values of other databases. Thus, the application conversion matching module may generate a total monetary value for the application conversions for the content item and/or a total monetary value for all conversions for the content item using the monetary value for the matched application conversion.

In some implementations, the aggregating of a monetary value of the conversion with other monetary values associated with other conversions for the content item (block 610) may be included as part of process 400 and/or process 500.

In some implementations, the second data may include the account identifier with the application identifier when an action constituting a conversion occurs. Thus, the application conversion matching module may simply match the application identifier and account identifier from the second data to the application identifier and account identifier of the first data without utilizing a device identifier that is different from the account identifier.

VI. Implementation of a Computing System

Figure 7:
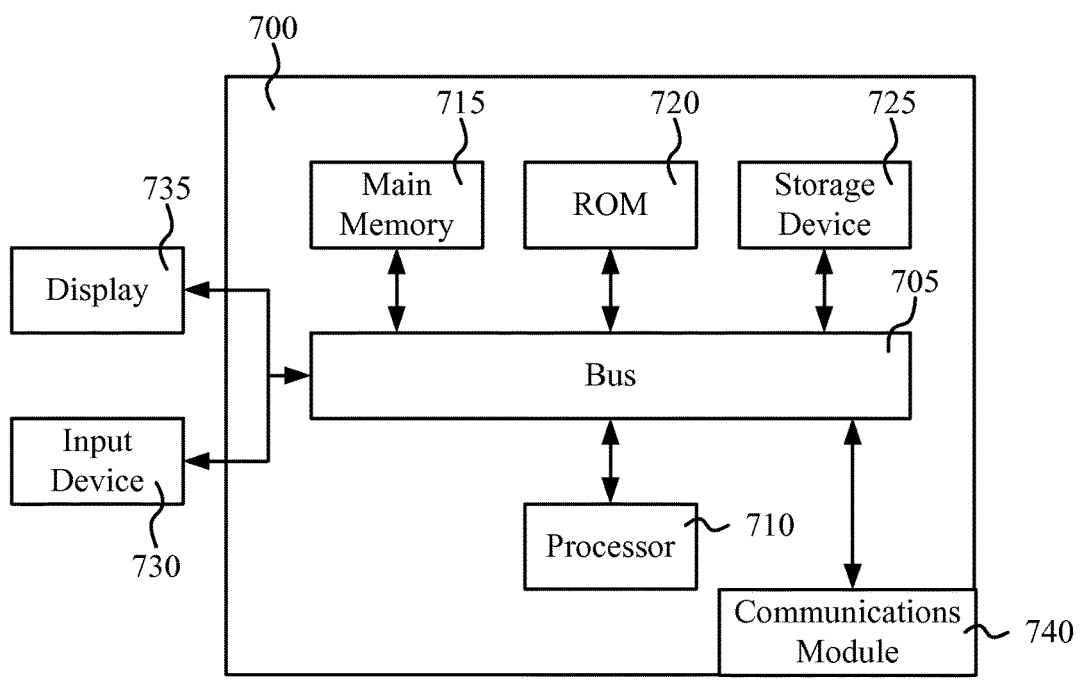
FIG. 7 is a block diagram depicting a general architecture for a computer system that may be employed to implement various elements of the systems and methods described and illustrated herein.

FIG. 7 is a block diagram of a computing system 700 that can be used to implement the client device 110, content item selection system 108, third-party content server 102, resource server 104, client device 200, etc. The computing system 700 includes a bus 705 or other communication component for communicating information and a processor 710 coupled to the bus 705 for processing information. The computing system 700 can also include one or more processors 710 coupled to the bus for processing information. The computing system 700 also includes main memory 715, such as a RAM or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a ROM 720 or other static storage device coupled to the bus 705 for storing static information and instructions for the processor 710. A storage device 725, such as a solid state device, magnetic disk or optical disk, is coupled to the bus 705 for persistently storing information and instructions. Computing device 700 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 700 may be coupled via the bus 705 to a display 735, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 730, such as a keyboard including alphanumeric and other keys, may be coupled to the bus 705 for communicating information and command selections to the processor 710. In another implementation, the input device 730 may be integrated with the display 735, such as in a touch screen display. The input device 730 can include a cursor control, such as a mouse, a trackball, or cursor direction keys, for communicating direction information and command selections to the processor 710 and for controlling cursor movement on the display 735.

According to various implementations, the processes and/or methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes and/or method steps described herein. One or more processors in a multi-processing arrangement may also be employed to execute the instructions contained in main memory 715. In alternative implementations, hard-wired circuitry may be used in place of or in combination with software instructions to effect illustrative implementations. Thus, implementations are not limited to any specific combination of hardware circuitry and software.

The computing system 700 also includes a communications module 740 that may be coupled to the bus 705 for providing a communication link between the system 700 and the network 106. As such, the communications module 740 enables the processor 710 to communicate, wired or wirelessly, with other electronic systems coupled to the network 106. For instance, the communications module 740 may be coupled to an Ethernet line that connects the system 700 to the Internet or another network 106. In other implementations, the communications module 740 may be coupled to an antenna (not shown) and provides functionality to transmit and receive information over a wireless communication interface with the network 106.

In various implementations, the communications module 740 may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The communications module 740 may include one or more transceivers configured to communicate using different types of protocols, communication ranges, operating power requirements, RF sub-bands, information types (e.g., voice or data), use scenarios, applications, and/or the like. In various implementations, the communications module 740 may comprise one or more transceivers configured to support communication with local devices using any number or combination of communication standards.

In various implementations, the communications module 740 can also exchange voice and data signals with devices using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks 106 such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Although an implementation of a computing system 700 has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing system," "computing system," or "system" encompass all kinds of apparatus, devices, and machines for processing data, including without limitation a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, without limitation, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including without limitation semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method comprising:
   receiving, by one or more processors from a client device, first data from a web browser executing on the client device, the first data transmitted responsive to an interaction with a content item presented by the web browser on the client device, the first data comprising i) an application identifier specific to an application executable on the client device distinct from the web browser and ii) an account identifier specific to a user account registered with a web service provider;
   storing, by the one or more processors, the first data in a first database;
   receiving, by the one or more processors from the client device, second data from the application transmitted responsive to a conversion event in the application, the second data comprising the application identifier and a device identifier specific to the client device, the device identifier different from the account identifier;
   storing, by the one or more processors, the second data in a second database;
   receiving, by the one or more processors from the client device, third data corresponding to utilization of the web service provider by the user account, the third data comprising the account identifier and the device identifier;
   retrieving, by the one or more processors, from the first database, the application identifier of the first data using a first query including the account identifier received in the third data;
   retrieving, by the one or more processors, from the second database, the application identifier of the second data using a second query including the device identifier received in the third data; and
   determining, using the one or more processors, that the conversion is attributable to the interaction with the content item based on a match between the application identifier retrieved using the first query and the application identifier retrieved using the second query.

2. The method of claim 1, wherein the first data further comprises a first timestamp and the second data comprises a second timestamp, and wherein determining the conversion is attributable to the interaction with the content item is further based on a difference between the first timestamp and the second timestamp occurring within a predetermined period of time.

3. The method of claim 1 further comprising:
   calculating, using one or more processors, a number of application conversions based, at least in part, on the determination that the conversion is attributable to the interaction with the content item.

4. The method of claim 3 further comprising:
   calculating, using one or more processors, an estimated total conversion amount based, at least in part, on the calculated number of conversions and a login rate.

5. The method of claim 1, wherein the third data is received after receiving the second data associated with the conversion.

6. The method of claim 1, wherein the third data is received substantially concurrently with receiving the second data associated with the conversion.

7. The method of claim 1, further comprising storing, in a third database, data for the determined conversion attributed to the interaction with the content item.

8. The method of claim 1, wherein the second data further comprises a monetary value associated with the conversion, the method further comprising:

aggregating, using one or more processors, the monetary value associated with the conversion with other monetary values associated with other conversions for the content item.

9. The method of claim 1, wherein the client device is a mobile device and the application is a mobile application.

10. A system comprising:
one or more processors; and
one or more storage devices storing instructions that, when executed by the one or more processors, cause the one or more processors to perform operations comprising:
receiving, from a client device, first data from a web browser executing on the client device, the first data transmitted responsive to an interaction with a content item presented by the web browser on the client device, the first data comprising i) an application identifier specific to an application executable on the client device distinct from the web browser, ii) an account identifier specific to a user account registered with a web service provider, and iii) a first timestamp;
storing, by the one or more processors, the first data in a first database;
receiving, from the client device, second data from the application transmitted responsive to a conversion event in the application, the second data comprising the application identifier, a device identifier specific to the client device, and a second timestamp, the device identifier different from the account identifier;
storing, by the one or more processors, the second data in a second database;
receiving, from the client device, third data corresponding to utilization of the web service provider by the user account, the third data comprising the account identifier and the device identifier;
retrieving, from the first database, the application identifier of the first data using a first query including the account identifier received in the third data;
retrieving, from the second database, the application identifier of the second data using a second query including the device identifier received in the third data; and
determining that the conversion is attributable to the interaction with the content item based on a match between the application identifier retrieved using the first query and the application identifier retrieved using the second query and a difference between the first timestamp and the second timestamp occurring within a predetermined period of time.

11. The system of claim 10, wherein the one or more storage devices store instructions that, when executed by the one or more processors, cause the one or more processors to perform operations further comprising:
calculating a number of application conversions based, at least in part, on the determination that the conversion is attributable to the interaction with the content item.

12. The system of claim 11, wherein the one or more storage devices store instructions that, when executed by the one or more processors, cause the one or more processors to perform operations further comprising:
calculating an estimated total conversion amount based, at least in part, on the calculated number of conversions and a login rate.

13. The system of claim 12, wherein the login rate is based, at least in part, on a percentage of client devices logged into accounts via a web browser when interacting with content items via the web browser.

14. The system of claim 10, wherein the third data is received responsive to execution of another application and after receiving the second data associated with the conversion.

15. The system of claim 10, wherein the second data further comprises a monetary value associated with the conversion, and wherein the one or more storage devices store instructions that, when executed by the one or more processors, cause the one or more processors to perform operations further comprising:
calculating an average monetary value based, at least in part, on the monetary value associated with the conversion.

16. A non-transitory computer readable storage device storing instructions that, when executed by one or more processors, cause the one or more processors to perform operations comprising:
receiving first data from a mobile device, the first data transmitted from a web browser executing on the mobile device responsive to an interaction with a content item presented by the web browser on the mobile device, the first data comprising i) an application identifier specific to a mobile application executable on the client device distinct from the web browser and ii) an account identifier specific to a user account registered with a web service provider;
storing the first data in a first database;
receiving from the mobile device second data transmitted by the mobile application responsive to a conversion event in the mobile application, the second data comprising the application identifier and a device identifier specific to the mobile device, the device identifier different from the account identifier;
storing the second data in a second database;
receiving third data from the mobile device, the third data corresponding to utilization of the web service provider by the user account, the third data comprising the account identifier and the device identifier;
retrieving the application identifier of the first data from the first database using a first query including the account identifier received in the third data;
retrieving the application identifier of the second data from the second database using a second query including the device identifier received in the third data;
determining that the conversion is attributable to the interaction with the content item based on a match between the application identifier retrieved using the first query and the application identifier retrieved using the second query; and
storing data for the determined conversion attributed to the interaction with the content item in a third database.

17. The non-transitory computer readable storage device of claim 16, wherein the first data further comprises a first timestamp and the second data comprises a second timestamp, and wherein determining the conversion is associated with the interaction with the content item displayed with the resource is further based on a difference between the first timestamp and the second timestamp occurring within a predetermined period of time.

18. The non-transitory computer readable storage device of claim 16 storing instructions that, when executed by one or more processors, cause the one or more processors to perform operations further comprising:
calculating a number of conversions attributable to presentations of the content item based, at least in part, on the conversion determined to be attributed to the interaction with the content item; and calculating an estimated total conversion amount based, at least in part, on the calculated number of mobile conversions and a login rate.

19. The non-transitory computer readable storage device of claim 18, wherein the login rate is based on a percentage of mobile devices logged into accounts via a web browser when interacting with content items via the web browser and an estimated percentage of mobile devices having one or more applications associated with the accounts.

20. The non-transitory computer readable storage device of claim 16 storing instructions that, when executed by one or more processors, cause the one or more processors to perform operations further comprising:

identifying a monetary value associated with the conversion; and aggregating the monetary value associated with the conversion with other monetary values associated with other conversions for the content item.

* * * * *